(12) United States Patent
Friman et al.

(10) Patent No.: US 6,741,858 B1
(45) Date of Patent: May 25, 2004

(54) METHOD OF CHANGING COMMUNICATION CHANNEL IN MOBILE SYSTEM

(75) Inventors: Leif Friman, Järvenpää (FI); Tapani Virtanen, Vantaa (FI); Juha Bäck, Helsinki (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/622,014

(22) PCT Filed: Feb. 10, 1999

(86) PCT No.: PCT/FI99/00099
§ 371 (c)(1),
(2), (4) Date: Sep. 12, 2000

(87) PCT Pub. No.: WO99/41929
PCT Pub. Date: Aug. 19, 1999

(30) Foreign Application Priority Data

Feb. 11, 1998 (FI) .................................................. 980313

(51) Int. Cl.[7] .................................................. H04Q 7/20
(52) U.S. Cl. ........................ 455/436; 455/438; 455/442; 370/331; 370/332; 370/333
(58) Field of Search .................................. 455/436, 437, 455/438, 439, 440, 442, 443, 444; 370/331, 332, 333, 334, 335, 336, 337, 465

(56) References Cited

U.S. PATENT DOCUMENTS

| | | | | |
|---|---|---|---|---|
| 5,359,603 A | * | 10/1994 | McTiffin | 370/328 |
| 5,436,900 A | * | 7/1995 | Hammar et al. | 370/336 |
| 5,475,686 A | * | 12/1995 | Bach et al. | 370/465 |
| 5,682,416 A | * | 10/1997 | Schmidt et al. | 455/436 |
| 5,953,668 A | * | 9/1999 | Reilly | 455/442 |
| 6,097,730 A | * | 8/2000 | Rottler et al. | 370/465 |
| 6,138,020 A | * | 10/2000 | Galyas et al. | 455/436 |
| 6,266,332 B1 | * | 7/2001 | Koivu | 370/336 |

FOREIGN PATENT DOCUMENTS

SE   WO-93/16568   *   8/1993   ............ H04Q/11/04

OTHER PUBLICATIONS

GSM Technical Specification, ETSI, Sep. 1997.*

* cited by examiner

Primary Examiner—William Trost
Assistant Examiner—Stephen D'Agosta
(74) Attorney, Agent, or Firm—Pillsbury Winthrop LLP

(57) ABSTRACT

The present invention relates to a method of changing a telecommunication channel in a mobile communication system for a given mobile station, which mobile station has a connection in progress, and the connection is provided with a channel on a radio connection between the mobile station and base station system and a telecommunication channel between the base station system and a mobile services switching center. In order to facilitate the changing of the telecommunication channel the method includes putting a new telecommunication channel between the mobile services switching center and the base station system, indicated by the handover message into use for the connection, and connecting the channel used to the new telecommunication channel in such a way that the radio channel remains unchanged irrespective of the change of the telecommunication channel.

7 Claims, 3 Drawing Sheets

| INFORMATION ELEMENT | REFERENCE | DIRECTION | TYPE | LEN |
|---|---|---|---|---|
| Message type | 3.2.2.1 | BSS-MSC | M | 1 |
| Cause | 3.2.2.5 | BSS-MSC | M | 3-4 |
| Response request | 3.2.2.28 | BSS-MSC | O | 1 |
| Cell identifier list (preferred) | 3.2.2.27 | BSS-MSC | M | 2n+3 to 7n+3 |
| Circuit pool list | 3.2.2.46 | BSS-MSC | O | V |
| Current channel | 3.2.2.49 | BSS-MSC | O | 2 |
| Speech version (used) | 3.2.2.51 | BSS-MSC | O | 2 |
| Queueing indicator | 3.2.2.50 | BSS-MSC | O | 2 |
| Circuit identity | 3.2.2.2 | BSS-MSC | O | |

FIG. 2

METHOD OF CHANGING COMMUNICATION CHANNEL IN MOBILE SYSTEM

BACKGROUND OF THE INVENTION

1. Field of the Invention

The present invention relates to a method of changing a telecommunication channel in a mobile communication system for a given mobile station, which mobile station has a connection in progress, and the connection is provided with at least a channel on a radio connection between the mobile station and a base station system and a telecommunication channel between the base station system and a mobile services switching centre, and in which method: a handover message is received. The invention further relates to a mobile communication system comprising: a mobile services switching centre, a base station system, a speech processing unit communicating with the base station system through first telecommunication channels and with the mobile services switching centre through second telecommunication channels, in which case a predetermined correspondence is defined for the first and second telecommunication channels, and a mobile station having a connection in progress through the base station system and the mobile services switching centre, in which case the ongoing connection of the mobile station is provided at least with: a channel of a radio connection between the mobile station and the base station system, and at least one of the first telecommunication channels and at least one of the second telecommunication channels for transmitting telecommunication signals associated with the ongoing connection of the mobile station between the base station system and the mobile services switching centre.

2. Description of Prior Art

The present invention relates to the changing of a telecommunication channel in a data transmission network between a base station system and a mobile services switching centre, particularly in a digital mobile communication system. In this application, the concept base station system means the entity which is formed of base stations and their controller means, such as a base station controller.

The frequency spectrum required by a digital mobile communication system, such as the GSM system (Global System for Mobile Communications), depends on the transmission rate used on a radio path. The higher the transmission rate used on the radio path, the wider the frequency spectrum required. Consequently, speech encoding of a fixed PSTN/ISDN telephone network (Public Switched Telephone Network/Integrated Services Digital Network), used for transmitting digitally encoded information 64 kbit/s for each traffic channel, is not normally suitable for use on the radio path. For this reason, instead of speech encoding of the fixed network, RPE-LTP speech encoding (Regular Pulse Excitation—Long Term Prediction) is used on the radio path of the GSM system, for example.

In order to adapt different encoding schemes and different data transmission rates, a speech processing unit (a transcoder) is required between the base station system and the mobile services switching centre. In other words, in the GSM system, for example, the interfaces for the transcoder are 64 kbit/s towards the mobile services switching centre and 8 or 16 bits/s towards the base station system. In the GSM system, the first telecommunication channels, i.e. the connections between the transcoder and the base station system, are called Ater lines. Correspondingly, the second telecommunication channels, i.e. the connections between the transcoder and the mobile services switching centre, are called A interface lines. A predetermined correspondence has been defined for the first and second telecommunication channels, i.e. it has been defined beforehand that the given A interface line corresponds to the given Ater line (or given Ater lines).

In a known mobile communication system of the above type, a need occasionally arises to change for an ongoing connection, such as a call, the telecommunication channels used between the base station system and the mobile services switching centre. Such a need may arise when a call type has changed, when an encoding scheme for a call is wished to be changed (in which case the call is to be directed to another speech processing unit) or when the use of the speech processing unit employed is wished to be optimized, for example.

In known mobile communication systems, the above-mentioned telecommunication channels are changed by handover which is carried out to the connection in question. In that case, for instance the signalling channel and the first and second telecommunication channels between the base station system and the mobile services switching centre change. In addition, the channel of the radio connection between the mobile station and the base station system change. Consequently, such handover requires much signalling by the mobile station and other elements in the system before it can be completely accomplished. However, somewhat excessive resources are required for this kind of known handover, since no advantage is necessarily gained by the change of the channel of the radio connection.

SUMMARY OF INVENTION

An object of the present invention is to solve the above problem and provide a solution by means of which the telecommunication channel between the base station system and the mobile services switching centre can be changed in an easier and more resource-saving manner. This objective is achieved by the method of the invention which is characterized in that the method comprises the steps of: putting a new telecommunication channel between the mobile services switching centre and the base station system, indicated by the handover message, into use for the connection, and connecting the channel of the radio connection used by the connection to the new telecommunication channel such that the channel of the radio connection remains unchanged irrespective of the change of the telecommunication channel between the base station system and the mobile services switching centre.

The invention also relates to a mobile communication system to which the method of the invention can be applied. The mobile communication system of the invention is characterized in that the mobile services switching centre comprises means for receiving a handover message and means for putting a new second telecommunication channel indicated by the handover message into use for the connection indicated by the handover message, and that the base station system comprises means for transmitting the handover message to the mobile services switching centre, and means for taking a new first telecommunication channel, which corresponds to the new second telecommunication channel indicated by the handover message, into use for the connection indicated by the handover message, in which case the base station system is arranged to connect the new first telecommunication channel to the channel of the radio connection assigned to the mobile station in such a way that the channel of the radio connection remains unchanged irrespective of the change of the first and second telecommunication channels.

The invention is based on the idea that it is possible to change the telecommunication channels between the base station system and the mobile services switching centre in an extremely simple and resource-saving manner when the system is provided with, in addition to a more complete conventional handover operation, a second handover procedure which can be implemented by fewer resources. This is achieved when the base station system is arranged to indicate a new channel for the ongoing connection to the mobile services switching centre directly in the handover message. Such a new handover procedure makes it possible that the channel of the radio connection between the mobile station and the base station system needs not be changed, for example, whereby the mobile station does not need to be in any way aware of the change of the telecommunication channel. Furthermore, the invention makes it possible that the existing logical SCCP signalling channel (Signalling Connection Control Part) between the mobile services switching centre and the base station system can be kept unchanged, i.e. it is not necessary to change it to a new signalling channel as in known handovers. The most significant advantage of the solution of the invention is thus that the telecommunication channel between the base station system and the mobile services switching centre can be changed as quickly as possible in a most resource-saving manner in which the amount of the required signalling has been minimized.

The preferred embodiments of the method and mobile communication system of the invention are disclosed in the accompanying dependent claims 1 and 2 to 6.

BRIEF DESCRIPTION OF THE DRAWINGS

In the following, the invention will be described by way of example with closer reference to the accompanying drawings, in which FIG. 2 illustrates the contents of a handover message.

DETAILED DESCRIPTION OF PREFERRED EMBODIMENTS

Figure 1:
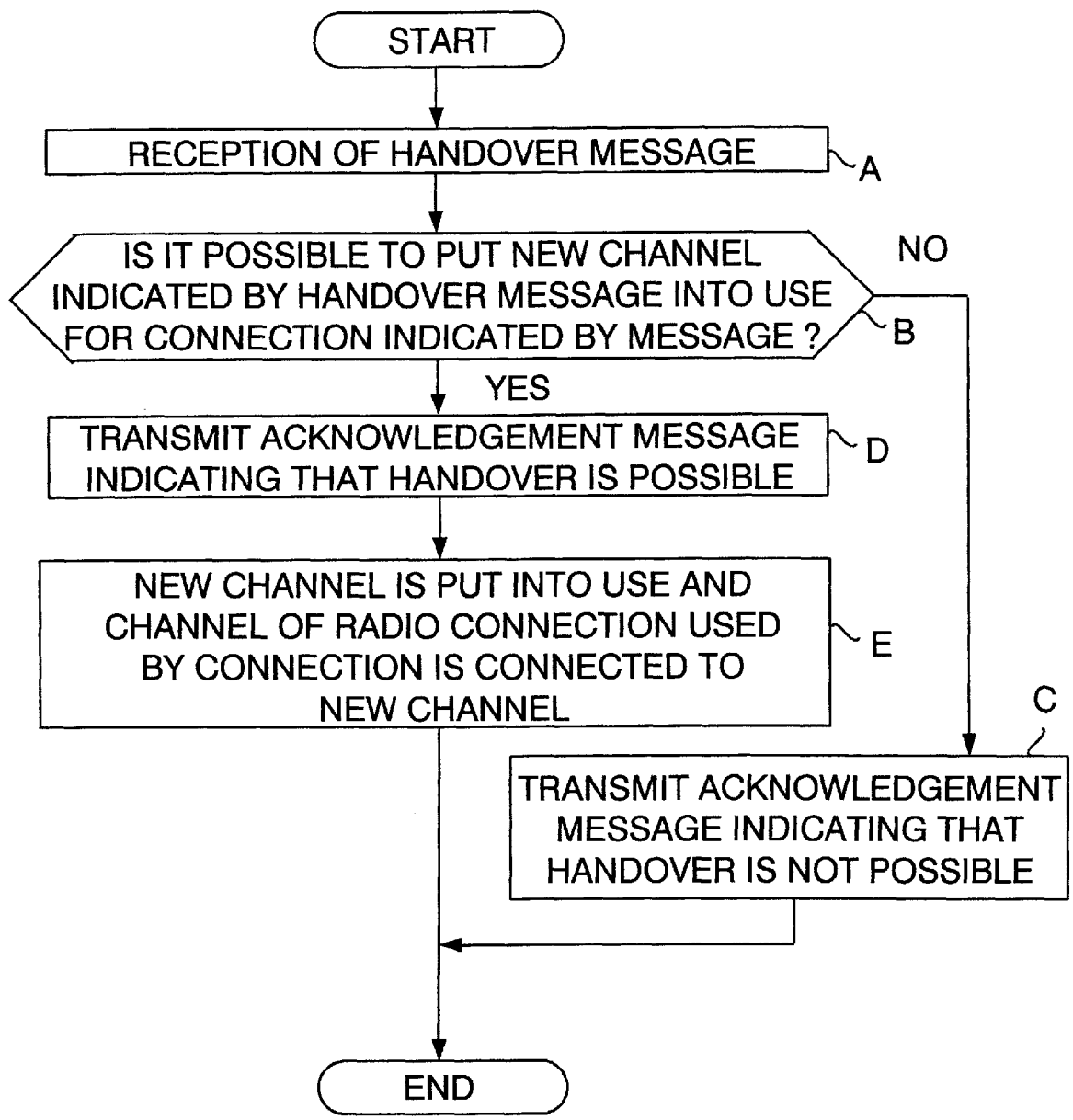
FIG. 1 shows a flow diagram of a first preferred embodiment of the method of the invention.

FIG. 1 shows a flow diagram of a first preferred embodiment of the method of the invention. The flow diagram of FIG. 1 is applicable in the GSM system, for example, for changing telecommunication channels between a base station system and a mobile services switching centre for a given ongoing connection.

In block A, a handover message is received from a base station controller, for example. In accordance with the invention, the base station controller uses as the handover message a HANDOVER_REQUIRED message according to section 08.08 of the GSM specifications, for example, to which information is added on a new second telecommunication channel. The contents of the HANDOVER_REQUIRED message is illustrated in FIG. 2.

In block B, it is checked if the ongoing connection, i.e. the call in progress, can put into use the new second telecommunication channel which was included in the handover message. If the new second telecommunication channel, which is in the case of the GSM system formed of an A interface line, can be put into use, then the routine proceeds to block D. In contrast, if the A interface line in question for some reason cannot be given for use for the call in question, the routine proceeds to block C.

In block C, an acknowledgement message is transmitted which indicates that handover is not possible because the channel included in the handover message cannot be given for use for the call, for example. In that case, the acknowledgement message can be, for example, a HANDOVER_REQUIRED_REJECTED message according to section 08.08 of the GSM specifications, being transmitted from the mobile services switching centre to the base station controller.

In contrast, if handover is possible, an acknowledgement message is transmitted in block D, indicating that handover is possible. In that case, the acknowledgement message can be, for example, a HANDOVER_SUCCEEDED message according to section 08.08 of the GSM specifications, being transmitted from the mobile services switching centre to the base station controller.

When the base station controller and the mobile services switching centre are aware of the new channel and when the acknowledgement message indicates that handover is possible, the mobile services switching centre starts using a new A interface line. Correspondingly, the base station system starts using an Ater line which corresponds to the A interface line in question. The base station controller then connects the channel used by the radio connection to the new Ater line for the mobile station, and the channel of the radio connection then remains unchanged irrespective of the change of the channel between the base station system and the mobile services switching centre.

Instead of the above HANDOVER_REQUIRED HANDOVER_REQUIRED_REJECTED and HANDOVER_SUCCEEDED messages, it is naturally possible to define entirely new messages which are utilized in the application of the invention.

FIG. 2 illustrates the contents of a handover message. The handover message presented in FIG. 2 corresponds to the HANDOVER_REQUIRED message according to section 08.08 of the GSM specifications in other respects except that a circuit identity element is added thereto.

In order to change an ongoing telecommunication channel in accordance with the invention, the base station controller, when transmitting a handover message to the mobile services switching centre, gives a code as the value of the Cause information element, the code indicating "change the A interface line". In addition, the base station controller adds a circuit identity information element to the message. The value of the circuit identity element in question indicates the new A interface line to the mobile services switching centre, which A interface line the base station controller suggests to be used for the connection.

Figure 3:
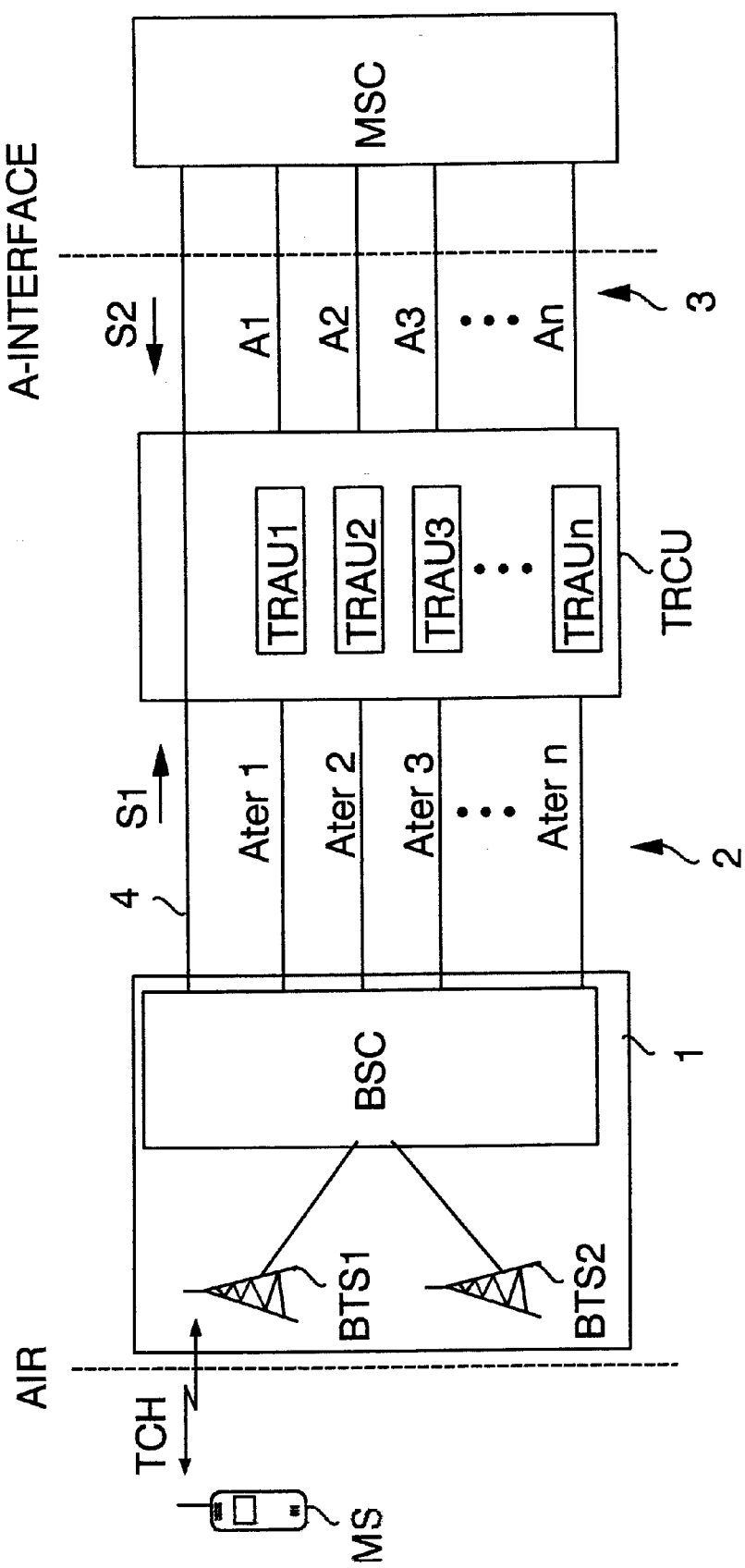
FIG. 3 shows a block diagram of a first preferred embodiment of a mobile communication system of the invention.

FIG. 3 shows a block diagram of a first preferred embodiment of a mobile communication system of the invention. The mobile communication system of FIG. 3 may be a GSM system, for example.

FIG. 3 shows a base station system 1 comprising a base station controller BSC and two base stations BTS1 and BTS2. The base station system 1 has a data transmission connection to a speech processing unit TRCU through first data transmission channels 2. In the GSM system, the first data transmission channels in question consist of Ater lines Ater 1 ... Ater n which have a data transmission capacity of 16 kbit/s. In practice, the Ater lines may be composed of time slots or time slot portions of a PCM connection-(Pulse Code Modulation). For a full-rate call, for example, one of the Ater lines in question is entirely reserved to be used by the call.

The speech processing unit TRCU comprises a transcoder unit TRAU . . . TRAUn for each Ater line. Each transcoder unit carries out encoding, decoding and rate adaptation operations required by the connection which is transmitted via the Ater line in question. The speech processing unit TRCU communicates with a mobile services switching centre via second data transmission connections 3. In the GSM system, the second data transmission channels in question consist of A interface lines A1 . . . An which have a data transmission capacity of 64 kbit/s. In practice, each A interface line may consist of a time slot of a PCM connection. In the case of FIG. 3, a given correspondence is determined for the Ater lines and the A interface lines. In other words, when the A interface line A1 is selected for the full-rate call, for example, the Ater line Ater 1 is at the same time automatically selected for the call in question.

In the case of FIG. 3, a call is in progress from a mobile station MS to a subscriber station (not shown in the figure) of a fixed telephone network, for example. A traffic channel TCH is allocated to the call in question from a radio connection. The mobile station communicates with the base station BTS1 via the traffic channel. The signals associated with the call are further transmitted from the base station to the base station controller BSC. In the following it is assumed that the call in question is provided with the first data transmission channel Ater1 and the second data transmission channel A1. In addition, the call is provided in a manner known per se with a signalling channel 4 (signalling connection control part SCCP) between a mobile services switching centre MSC and the base station system 1. In practice, one such logical signalling channel is reserved for each A interface line. A specific signalling channel thus exists for each connection. The signalling channels are transferred in given PCM time slots.

When detecting that the data transmission channel between the base station system 1 and the mobile services switching centre MSC of the call in progress from the mobile station MS should be changed, the base station controller BSC transmits a handover message S1 on the signalling channel 4 to the mobile services switching centre. The contents of the handover message in question corresponds to the handover message presented in FIG. 2. It is then possible to give A3 as the value of the circuit identity element of the message (when it is assumed that the base station controller suggests that the call should be transferred to the A interface line A3).

Upon receiving the handover message S1, the mobile services switching centre checks if it can put line A3 into use for the call. Next, it transmits an acknowledgement message S2 on the signalling channel 4 to the base station controller BSC. The mobile services switching centre indicates by the acknowledgement message that it is possible or that it is not possible to put line A3 into use.

If the A interface line A3 can be put into use, the mobile services switching centre MSC carries out the necessary internal switchings after transmitting the acknowledgement message S2 so as to be able to transfer the call of the mobile station MS to the A interface line A3. Correspondingly, after receiving the acknowledgement message S2, the base station controller detects that the line A3 can be put into use. Since there is a predetermined correspondence between the A interface line 3 and the Ater line 2, the base station controller MSC is next able to carry out necessary internal switchings in order to put the Ater line Ater 3, which corresponds to the A interface line A3, into use for the call of the mobile station MS. Then the base station controller BSC connects, for instance, the traffic channel TCH of the base station BTS1 to the Ater line Ater3. Consequently, the desired change of the channel has been accomplished without the mobile station MS being aware of it, i.e. the traffic channel TCH it has used on the radio connection remains unchanged. In addition, the signalling channel 4 allocated to the call of the mobile station MS remains unchanged.

It will be understood that the above description and the related figures are only intended to illustrate the present invention. The invention can thus be applied in systems other than the GSM system described above by way of example. In addition, it will be apparent to those skilled in the art that many variations and modifications can be made without departing from the scope and spirit of the invention disclosed in the attached claims.

What is claimed is:

1. A method of changing a telecommunication channel in a mobile communication system for a given mobile station, which mobile station has a connection in progress, and the connection is provided with at least a channel on a radio connection between the mobile station and a base station system and a telecommunication channel between the base station system and a mobile services switching centre, and wherein the connection is further provided with a signalling channel between the base station system and the mobile services switching centre, said method comprising:

transmitting a handover message from a base station system to a mobile services switching centre handling the call, said handover message indicating for the mobile services switching centre a new telecommunication channel for said connection between the mobile services switching centre and the base station system, putting at said mobile services switching centre said new telecommunication channel indicated by the handover message into use for the connection between the mobile services switching centre and the base station system, and connecting at the base station system the channel of the radio connection used by the connection to the new telecommunication channel such that the channel of the radio connection remains unchanged irrespective of the change of the telecommunication channel between the base station system and the mobile services switching centre whereby the new telecommunication channel indicated by the handover message is put into use between the mobile services switching centre and the base station system without changing the signalling channel.

2. A mobile communication system comprising:

a mobile services switching centre, a base station system, a speech processing unit communicating with the base station system through first telecommunication channels and with the mobile services switching centre through second telecommunication channels, in which case a predetermined correspondence is defined for the first and the second telecommunication channels, and a mobile station having a connection in progress through the base station system and the mobile services switching centre, in which case the ongoing connection of the mobile station is provided at least with:

a channel of a radio connection between the mobile station and the base station system, and at least one of the first telecommunication channels and at least one of the second telecommunication channels for transmitting telecommunication signals associated with the ongoing connection of the mobile station between the base station system and the mobile services switching centre, said mobile services switching centre comprising means for receiving a handover message and means for putting a new second telecommunication channel indicated by the handover message into use for the connection indicated by the handover message, and as a response to the reception of the handover message, transmit an acknowledgement message to the base station system, the message indicating that the changing of the second telecommunication channel has been successful or it has failed, and said base station system comprising means for transmitting said handover message to the mobile services switching centre, and means for taking a new first telecommunication channel, which corresponds to the new second telecommunication channel indicated by the handover message, into use for the connection indicated by the handover message, the base station being responsive to the acknowledgement message to connect the new first telecommunication channel to the channel of the radio connection assigned to the mobile station in such a way that the channel of the radio connection remains unchanged irrespective of the change of the first and the second telecommunication channels, if the acknowledgement message indicates that the changing of the second telecommunication channel has been successful.

3. A mobile communication system as claimed in claim 2, wherein the mobile communication system is a GSM system, whereby:

a HANDOVER_REQUIRED message, to which message information has been added on the new telecommunication channel, is used as the handover message, a HANDOVER_SUCCEEDED message is used as the acknowledgement message when the changing of the second telecommunication channel is successful, and a HANDOVER_REQUIRED_REJECTED message is used as the acknowledgement message when the changing of the second telecommunication channel fails.

4. A mobile communication system as claimed in claim 2, wherein the first telecommunication channels are Ater lines, and the second telecommunication channels are A interface lines.

5. A mobile communication system as claimed in claim 2, wherein the speech processing unit is connected to the base station system and the mobile services switching centre over a PCM connection, whereby the first and the second telecommunication channels consist of PCM connection time slots or their portions.

6. A mobile communication system comprising:

a mobile services switching centre, a base station system, a speech processing unit communicating with the base station system through first telecommunication channels and with the mobile services switching centre through second telecommunication channels, in which case a predetermined correspondence is defined for the first and the second telecommunication channels, and a mobile station having a connection in progress through the base station system and the mobile services switching centre, in which case the ongoing connection of the mobile station is provided at least with:

a channel of a radio connection between the mobile station and the base station system, at least one of the first telecommunication channels and at least one of the second telecommunication channels for transmitting telecommunication signals associated with the ongoing connection of the mobile station between the base station system and the mobile services switching centre, and a signalling channel between the mobile services switching centre and the base station system, said mobile services switching centre comprising means for receiving a handover message and means for putting a new second telecommunication channel indicated by the handover message into use for the connection indicated by the handover message, and said base station system comprising means for transmitting said handover message to the mobile services switching centre, and means for taking a new first telecommunication channel, which corresponds to the new second telecommunication channel indicated by the handover message, into use for the connection indicated by the handover message, in which case the base station system is arranged to connect the new first telecommunication channel to the channel of the radio connection assigned to the mobile station in such a way that the channel of the radio connection remains unchanged irrespective of the change of the first and the second telecommunication channels and the signalling channel remains unchanged irrespective of the change of the first and the second telecommunication channels.

7. A mobile communication system comprising:

a mobile services switching centre, a base station system, a speech processing unit communicating with the base station system through first telecommunication channels and with the mobile services switching centre through second telecommunication channels, in which case a predetermined correspondence is defined for the first and the second telecommunication channels, and a mobile station having a connection in progress through the base station system and the mobile services switching centre, in which case the ongoing connection of the mobile station is provided at least with:

a channel of a radio connection between the mobile station and the base station system, and at least one of the first telecommunication channels and at least one of the second telecommunication channels for transmitting telecommunication signals associated with the ongoing connection of the mobile station between the base station system and the mobile services switching centre, said mobile services switching centre comprising means for receiving a handover message and means for, as a response to the reception of the handover message, putting a new second telecommunication channel indicated by the handover message into use for the connection indicated by the handover message, and for transmitting an acknowledgement message to the base station system, the acknowledgement message indicating that the changing of the second telecommunication channel has been successful or it has failed, said base station system comprising means for transmitting said handover message to the mobile services switching centre, and means for taking a new first telecommunication channel, which corresponds to the new second telecommunication channel indicated by the handover message, into use for the connection indicated by the handover message, in which case the base station system is, as a response to said acknowledgement message, arranged to connect the new first telecommunication channel to the channel of the radio connection assigned to the mobile station in such a way that the channel of the radio connection remains unchanged irrespective of the change of the first and the second telecommunication channels, if the acknowledgement message indicates that the changing of the second telecommunication channel has been successful, and said mobile services switching center and said base station system are arranged to keep a signalling channel provided for the mobile station between the mobile services switching centre and the base station system as unchanged irrespective of the change of the first and the second telecommunication channels.

* * * * *